3,523,010
THERMAL CARBON BLACK PROCESS
John H. Horn and William R. Morehead, Pampa, Tex., assignors to Cabot Corporation, Boston, Mass., a corporation of Delaware
No Drawing. Filed Nov. 29, 1967, Ser. No. 686,720
Int. Cl. C09c 1/54
U.S. Cl. 23—209.4                                    5 Claims

ABSTRACT OF THE DISCLOSURE

The present invention comprises an improvement in the production of thermal carbon blacks which results in increased throughput, yield and superior product properties. Broadly, said improvement comprises selectivity reducing the rate at which hydrocarbon make fuel is charged into the hydrocarbon dissociation zone in response to decreasing available heat therein.

---

In a typical thermal carbon black producing process, a hydrocarbon feedstock material, commonly referred to as make fuel, is introduced into a heated, enclosed, dissociation zone (generator). The hydrocarbon make is thermally dissociated within said zone to form carbon black and various gaseous byproducts. In prior art thermal black processes, said feedstock material, with or without diluents, additives, etc., is charged into the dissociation zone at relatively constant rate throughout the producing temperature and available heat within said zone diminishes due in part to normal heat losses through the producing apparatus and in part to the endothermic nature of the dissociation reaction. When the temperature of said zone falls below that required for the production of the desired product, the charging of make fuel is arrested and the dissociation zone reheated.

The conventional thermal black process is cyclic in nature and is thus subject to several obvious inefficiencies. For instance, it is standard practice to operate thermal black generators in pairs. While one of the generators is operating on the make cycle, the other is being reheated, generally by burning therein of the by-product off-gases from the make cycle generator. One of the methods generally utilized in controlling product properties of a thermal black process resides in limiting the length of the make cycle to relatively short periods of time in order to produce blacks of the desired particle diameter, surface area, particle size distribution and the like. Thus, any method by which the yield of carbon black per make cycle can be increased represents an important improvement in the thermal black producing art.

It is a principal object of the present invention to provide an improved process for the production of thermal blacks.

It is another object of the present invention to provide an improved process for the production of thermal blacks in which the yield of product black per make cycle is substantially increased.

It is still another object of the present invention to provide an improved process for the production of thermal blacks in which the product black has improved properties.

Other objects and advantages of the present invention will in part be obvious and will in part appear hereinafter.

In accordance with the improved process of the present invention, it has been discovered that substantial improvements in yield and properties of blacks produced by the aforedescribed thermal method are achieved when the rate of charge of hydrocarbon make fuel into the dissociation zone is selectively reduced.

The rate at which the diminution of feedstock material input is effected is subject to considerable variation depending upon such parameters as the geometry and heat loss characteristics of the specific generating apparatus utilized, the product black desired, etc. Generally speaking, however, it can be stated that the goal to be achieved in the practice of the present invention resides in the maintenance of a relatively constant ratio between available heat and make fuel concentration. Thus, having knowledge of (1) the heat requirements for the dissociation of the specific make fuel to be utilized, and (2) the heat loss rate of the particular generating apparatus, an appropriate balance can be maintained between make fuel injection rate relative to the rate at which heat is lost from the dissociation zone during the make cycle.

Therefore, it is obvious that in order to provide a quantitative basis for the practice of the improvement of the present invention, it is necessary that the total heat loss rate from a thermal black producing generator be determined. Any suitable method for making said determination is acceptable and will be known and understood to those skilled in the art. In order to establish guide lines for such determinations, however, it should again be noted that heat losses in thermal black production normally occur in accordance with two general pathways:

(1) Parasitic heat losses occurring through the producing apparatus by way of conduction, convection, radiation, etc., and (2) Heat losses incurred due to the utilization of heat in the dissociation of the make fuel.

The heat losses occurring by way of pathway (1) are dictated to a large extent by the design, geometry, materials of construction, etc., of the particular thermal black generator apparatus and are obviously subject to substantial variation. Thus, such heat losses can generally be best determined for any particular thermal black producing generator by direct evaluation during operations.

The rate of heat loss due to pathway (2) above can generally be readily determined when the composition of the make fuel is fully taken into account. Generally speaking, it has been found that the dissociation requirements of hydrocarbon make fuels can vary between about 3,000 B.t.u. and about 34,000 B.t.u. per pound of theoretically available carbon. When methane (natural gas), which is a common and preferred make fuel for thermal black production, represents the sole constituent of the make fuel stream, the heat requirement for dissociation thereof to carbon can be calculated on the basis of about 32,000 B.t.u. per pound of carbon. It should be further pointed out that diluents, additives, etc. often form part of the make fuel stream to be charged into the generator apparatus. Obviously, such adjuvants are also heated within the generating apparatus and thus utilize heat for purposes other than carbon black production. Such heat losses should also be taken into account when their contribution to the overall heat loss rate from the generating apparatus is substantial. Broadly speaking, therefore, the profile of an ideal line graph plotting the available heat history of the make cycle of a thermal black generator operated in accordance with the present invention will tend towards an exponential decrease in available heat with respect to time.

The particular method by which the diminution of feedstock material is achieved is normally not critical. Generally it is preferable that said diminution be carried out on a substantially continuous basis; however, incremental diminutions are also acceptable provided that the aforementioned available heat:make fuel concentration ratio does not vary more than about 25% from the baseline throughout the make cycle. Preferably said ratio is not varied more than about 15% throughout the make cycle. As will be obvious to those skilled in the art, the specific apparatus by which the diminution of rate of make fuel charge is carried out can also vary greatly. For instance, it is specifically contemplated that the feed rate diminution of the present invention can be accomplished by means which operate either independently or dependently of generator operations. With respect to the latter mode of operation suitable means can comprise, for instance, heat sensing means adapted to measure the available heat or temperature within the operating generator in operative combination with control means to reduce the rate of make fuel input into the generator. Conversely, appropriate means which operate independently from the thermal black generator apparatus operations are also envisaged. An example of such means is represented by timer means in operative combination with means to reduce the rate of make fuel input into the generator. Obviously, the operation of the timer/reducing means apparatus is entirely distinct and divorced from the operation of the generator; however, the timer and rate reducing means, of course, should be adjusted to operate at predetermined intervals and to effect finite reductions in the rate of make fuel input in order to maintain the aforementioned available heat:make fuel concentration ratio. It should also be borne in mind, however, that the make fuel charge reduction of the present invention can obviously also be readily accomplished manually without need for special auxiliary apparatus.

There follows an illustrative, non-limiting example which is provided in order to lend a more precise understanding of the present invention and of the advantages accruing from the practice thereof:

EXAMPLE

The interior of a vertical cylindrical thermal black generator having a length of about 10 feet and a diameter of about 4 feet and lined with checkerwork was preheated to about 2600° F. by burning therein a mixture of natural gas and air.

Substantially immediately following attainment of said temperature, the air flow was arrested and the natural gas charge rate adjusted to and maintained at about 26 s.c.f.m. The resulting carbon black product and associated flue gases were exited through the top of the generator and were flowed through a quench tower and series of centrifugal collectors wherein the carbon black product was collected. After five minutes of operation, the temperature of the interior of the generator was determined to be about 1900° F. and production of black was discontinued. The above described heating and make cycle was then repeated for an additional 34 cycles. The carbon black produced and collected during the entire run was then weighed.

Next, a black producing run was accomplished in accordance with the teachings of the present invention. Accordingly, the interior of the generator apparatus was preheated as previously described to about 2600° F. The make cycle, however, was accomplished by initially charging natural gas into the generator at a rate of about 30 s.c.f.m. and, at each 75 second interval thereafter, reducing the make fuel feed rate by about 6 s.c.f.m. Accordingly, after 1 minute 15 seconds of the make cycle, the feed rate was reduced to about 24 s.c.f.m.; after 2 minutes 30 seconds, said feed rate was reduced to about 18 s.c.f.m.; at 3 minutes 45 seconds said feed rate was further reduced to about 12 s.c.f.m.; and, after five minutes of the make cycle operation, the black producing reaction was arrested. As in the standard run, this black producing run was repeated through 35 cycles. The collected black was then weighed and it was found that an increase in yield of about 12% by weight over the standard run was accomplished by the practice of the present invention. When the above rate reduction is achieved substantially continuously over the period of the make cycle rather than incrementally on increase in yield of about 14% by weight over the standard is realized.

Samples of the blacks produced in each of the aforementioned runs were compounded into separate standard natural rubber compositions. Said compositions were then formed into sheets, vulcanized and tested for tensile properties. It was discovered that the rubber compositions containing the blacks produced by way of the instant invention had substantially improved elongation at yield properties over the composition containing the thermal black produced in accordance with prior art practice.

Obviously, many changes can be made in the above example and description without departing from the scope of the invention.

For instance, make fuels comprising hydrocarbon substances other than the natural gas specifically utilized in the example are also suitable in the practice of the present invention. Thus, hydrocarbons such as butane, propane, volatilized hydrocarbon oils, etc., either singly or in combination, are also suitable as make fuels.

Further, it is not necessary that the reduction in make fuel input rate be instituted from the beginning of the make cycle. For instance, it has been our experience that substantial improvements in yield can also be achieved when initiation of the make fuel input rate reduction is achieved at any time during the first half of the make cycle.

Accordingly, it is intended that the above disclosure be regarded as illustrative and as in no way limiting the scope of the invention.

What is claimed is:

1. In the alternating heat-make cycle process for the production of thermal blacks in which the make cycle comprises charging a hydrocarbon make fuel into an enclosed, preheated, substantially oxygen-free dissociation zone thereby dissociating said make fuel to carbon and removing heat from said zone, the improvement which comprises maintaining the ratio of available heat:rate of make fuel charge into said zone constant to within about 25% by reducing the rate of said make fuel charge in response to decreasing available heat within said zone during the course of said make cycle.

2. The improvement of claim 1 wherein said ratio of available heat:rate of make fuel charge is maintained within about 15%.

3. The improvement of claim 1 wherein said make fuel comprises methane.

4. The improvement of claim 1 wherein said reduction in rate of said make fuel charge is accomplished substantially continuously.

5. The improvement of claim 1 wherein said reduction in rate of said make fuel charge is accomplished incrementally.

References Cited

UNITED STATES PATENTS

| | | | |
|---|---|---|---|
| 1,276,487 | 8/1918 | Brownlee et al. | 23—209.4 |
| 1,880,512 | 10/1932 | Spear | 23—209.4 |
| 1,881,325 | 10/1932 | Miller | 23—209.4 |
| 3,046,095 | 7/1962 | Williams | 23—209.4 |

OTHER REFERENCES

Paulsen: "Instrumentation." vol. 6, No. 6, 1953, pp. 35–37.

EDWARD J. MEROS, Primary Examiner